(12) United States Patent
Blundell et al.

(10) Patent No.: US 6,805,181 B2
(45) Date of Patent: Oct. 19, 2004

(54) ROTARY CUTTING AND/OR SEALING MECHANISMS

(75) Inventors: Brian Francis Blundell, Great Missenden (GB); Michael John Cahill, Coventry (GB); Kevin Richard Fincham, Coventry (GB); Paul Franklin, Coventry (GB); Geoffrey William Vernon, Coventry (GB); Peter Ernest Willett, High Wycombe (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 10/293,657

(22) Filed: Nov. 13, 2002

(65) Prior Publication Data

US 2003/0074797 A1 Apr. 24, 2003

Related U.S. Application Data

(63) Continuation of application No. 09/360,905, filed on Jul. 26, 1999, now Pat. No. 6,505,664.

(30) Foreign Application Priority Data

Jul. 30, 1998 (EP) .......................................... 98306080

(51) Int. Cl.[7] ................................................ B65B 9/10
(52) U.S. Cl. .................... 156/515; 156/251; 156/308.4; 156/530; 53/451; 53/552; 53/551; 83/344
(58) Field of Search ................................. 156/251, 515, 156/308.4, 530; 53/451, 552, 374.4, 530, 551, 479, 480; 83/344

(56) References Cited

U.S. PATENT DOCUMENTS

| | | | | |
|---|---|---|---|---|
| 3,943,686 A | * | 3/1976 | Crawford et al. ............. | 53/182 |
| 4,199,919 A | * | 4/1980 | Moscatelli .................... | 53/552 |
| 4,637,199 A | * | 1/1987 | Steck et al. ................... | 53/541 |
| 4,785,697 A | * | 11/1988 | Gherardi ...................... | 83/346 |
| 5,388,490 A | * | 2/1995 | Buck ............................ | 83/880 |
| 5,548,947 A | * | 8/1996 | Fincham et al. .............. | 53/551 |

FOREIGN PATENT DOCUMENTS

| | | | |
|---|---|---|---|
| GB | 2 159 089 | * | 11/1985 |
| WO | WO 95/01907 | * | 1/1995 |

* cited by examiner

Primary Examiner—Linda L. Gray

(57) ABSTRACT

A rotary mechanism for cutting and/or sealing a web has a pair of counter-rotating rotors mounted on parallel axes and having radially projecting arms between which the web is momentarily gripped for cutting and/or sealing. Sealing is performed by heated pressure outer faces on the rotor arms. Cutting is performed by cutter and anvil bars on the opposed arms engaging the web. Bearer faces on the arms beyond the pressure faces set a gap between the pressure faces and a rectangular-section tongue and groove in mating contact faces one side of the pressure faces locate the pressure faces laterally. The cutting means are adjusted by a wedge bar bearing on the inner face of the cutter bar or anvil. The wedge bar is movable in the direction of rotation and has an outer face inclined in the same direction. Means accessible from the leading and/or trailing faces of the rotor arms are provided for adjusting the wedge bar and clamping the cutter and anvil bars.

8 Claims, 4 Drawing Sheets

ROTARY CUTTING AND/OR SEALING MECHANISMS

This is a continuation of Ser. No. 09/360,905, filed Jul, 26, 1999, now U.S. Pat. No. 6,505,664.

BACKGROUND OF THE INVENTION

This invention relates to rotary mechanisms for cutting and/or sealing web materials. It is particularly concerned with the cutting and/or sealing of a continuously moving web by apparatus comprising counter-rotating rotors between which the web passes.

Heat sealing operations in such apparatus relies on the web material being momentarily engaged between opposed faces of the rotors as those faces come into juxtaposition and apply heat and pressure to the web material. If the material is not also to be severed by the heat and pressure, the contact pressure can be critical. To safeguard against inadvertent severing of the material it can be arranged that the mutually opposed faces are held apart at a small spacing as they come together. For this purpose it is known to provide contacting bearer elements standing slightly proud of the sealing faces on the rotors adjacent the web-gripping faces, as described in WO95/01907 (U.S. Pat. No. 5,548.947), that maintain a gap between those faces. For high speed running, these bearer elements can extend circumferentially in front of the sealing faces in the direction of rotation, to help ensure that dynamic disturbances from their initial contact do not affect the sealing process adversely.

For sealing web materials such as thermoplastic-coated paper, it is known to apply a crimp to seal the material more securely. Thus, the rotor sealing faces are formed with complementary arrays of V-grooves, running in the circumferential direction over the faces. If the complementary arrays are not closely aligned, however, a non-uniform spacing appears with an increased gap on one face of each V-groove and a reduced gap on the opposite face. This asymmetry produces a resultant lateral force component tending to limit such misalignment, but the higher pressure where the gap is reduced can damage the web material.

If the V-groove arrays are extended over the bearer elements, they will tend to correct any misalignment as they come into engagement, before the sealing faces engage the web material. However, as the faces of the bearer elements make direct contact, there are then very high local peak pressures experienced which can give rapid wear. Such wear may occur because there may be a relative misalignment between the pairs of bearer faces at opposite axial ends of a sealing face, since even a very small dimensional difference will prevent the grooves of both pairs of bearer faces meshing fully. Close control of dimensional tolerances can ensure that misalignment from this source will not adversely affect the web material, but larger misalignments. can be created by disturbing forces, such as differential thermal expansion effects. In that case, because the misalignment will only be reduced to the extent that the disturbing forces are balanced by the resultant lateral force on the bearer element grooves, their meshing may still leave significant non-uniformity in the spacing between the crimping grooves on the sealing faces.

SUMMARY OF THE INVENTION

According to a first aspect of the present invention, there is provided a rotary mechanism comprising at least one pair of rotors mounted for counter-rotation on parallel axes each having radially projecting arms with cutting and/or sealing means on radially outer faces of the arms to cut and/or seal web material between juxtaposed outer faces of the arms of said pair of rotors, the arms being provided with bearer elements arranged to contact each other when the faces are brought together and set a spacing between said juxtaposed faces, the cutting and/or sealing means of each outer face being located between first and second said bearer elements of the respective rotor arm, the cooperating first bearer elements at one end of the juxtaposed faces comprising means locating the arms relative to each other in the direction of the axes of rotation of the pair of rotors, and the cooperating second bearer elements at the other end of said faces permitting relative movement in said axial direction.

In this way it is possible firstly to reduce wear through relative misalignment between the bearer elements at opposite ends of a pair of sealing faces because the second pair of bearer elements are not constrained laterally by their engagement. In addition, however, it allows the adoption, in a preferred form of the invention, of an arrangement in which each said cooperating pair of first elements have on each element a pair of locating faces extending in substantially radial planes, said faces of one element of the pair being engaged between said faces of the other element of the pair.

While disposing said pairs of faces precisely in radial planes provides a form of engagement that positively precludes lateral misalignment, in practice the same effect can be achieved if they are inclined to some degree from the true radial direction.

Preferably, said pairs of faces are formed as mating male and female elements occupying only a minor part of the width of their bearer faces, the remaining parts of which will provide radial location setting the spacing between the rotor arms. In that case, said male and female elements may have respective radially outer and inner faces which are maintained out of contact with each other.

For effective use of the bearer elements to locate the arms of the respective rotors relative to each other, it is convenient to arrange that one rotor of the pair is resliently biased towards the other.

According to another aspect of the invention, there is provided a rotary mechanism comprising a pair of rotors mounted on respective carriers for counterrotation on parallel axes and each rotor having radially outer faces provided with cutting and/or sealing means to cut and/or seal web material engaged between said outer faces, one of the carriers being displaceably supported and being acted upon by biasing means to urge said outer faces into engagement, means being provided to limit the displacement of said one carrier by said biasing means, said biasing means being arranged to bear on said one carrier at a location substantially coincident with a plane containing the axes of the two rotors, and the displacement limiting means being provided by at least one stop element also substantially coincident with said plane of the rotor axes.

Such a mechanism can include with advantage the locating bearer elements of the first aspect of the invention so that transverse seals are made at intervals across a continuous tubular web and the web is severed simultaneously in the width of the seals in order to form a series of individual sealed packets.

If a rotary mechanism according to the first aspect of the invention is provided with web cutting means, the arrangement of the bearer elements is also able to offer an advantage as compared with the bearer elements referred to about complementary crimping V-grooves. As has already been explained, in the prior art rotors with grooved bearer elements, the V-grooves cannot be relied on to eliminate transverse misalignment in the mechanism and such misalignment will also cause a radial displacement when the bearer element faces engage each other. By the use of the bearer elements of the present invention, any correction of misalignment does not affect the relative radial positions of the rotor arms, so cooperating cutting elements on the juxtaposed outer faces of the arms remain unaffected.

This is particularly useful if the cutting elements are intended for crush cutting of the web material. In this cutting technique, the material is severed when it is nipped between a sharp-edged cutter element and an anvil element. The action requires a precise setting of the two elements relative to each other to ensure on the one hand that the cutting action is complete and on the other hand that the working life of the elements is not impaired by excess pressure loads.

It is usual to provide means for adjusting crush cutting elements in the radial direction to set them precisely and this is a requirement that can occur independently of the need to ensure the maintenance of the setting when axial misalignment of the rotor arm occurs.

In U.S. Pat. Nos. 5,211,096 and 4,785,697, GB 1469684 and 878556, and DE 4215196 and 4211187 crush-cutting means are provided on counter-rotating drums and adjustments are made by means of wedge elements which allow small controlled movements of the cutting elements to be made radially of their drums. There are limitations to these known adjustment mechanisms, however.

In particular, in the drums in which the crush-cutting elements and their adjustment means are deployed, the adjustment means occupy a relatively large space and they cannot easily be modified to fit a cutting and sealing mechanism comprising rotors provided with spaced, radially extending arms the outer ends of which carry the crush-cutting elements. Although operating conditions may dictate the more open configuration such a mechanism provides as compared with the generally cylindrical drums of these known forms of apparatus, the known adjustment means referred to above cannot be easily accommodated in such an alternative configuration and accessibility for adjustment may be compromised also.

Although some of the known crush cutting means referred to above have the mountings of the individual cutter and/or anvil elements set at fixed radial locations, others have some degree of resilient compliance in the mountings of the elements so that they can yield to pressure during the cutting operation. The yielding of the elements allows them to be set with a greater tolerance, but it introduces potential problems. For example, the mobility of the elements can be effective only to the extent that it is ensured that they remain free to move. Hostile operating conditions, eg. large temperature variations or a dusty or otherwise contaminated atmosphere, can easily lead to sliding bearings becoming locked fixed in their mountings. Also, if the cutter and anvil elements are not mounted true to each other, ie. if there is a run-out between the seatings of the cooperating elements along their length, the cutting pressures will differ along their length due to the tilting displacements of the elements.

According to a further aspect of the present invention, a rotary cutting mechanism is provided comprising at least one pair of rotors mounted for counter-rotation on parallel axes and each having radially projecting arms with cutting means on their axially outer ends, said cutting means comprising at least one elongate cutter element having a radially outer cutting edge and at least one cooperating elongate anvil element on the respective rotors, means for radial adjustment of the or each cutter element and/or the or each anvil element comprising an elongate wedge member extending in the longitudinal direction of the or each said cutter element or anvil element and a radially inner face of said cutter or anvil element being engaged by an outer face of the wedge member, a generally radially directed face of the or each wedge member being inclined with respect to its direction of rotation, there being means for adjusting the wedge member relative to the associated cutter or anvil element transversely to said rotary axis and securing it in its position of adjustment, thereby to control the radial setting of the associated cutter or anvil element.

Such an adjustment mechanism can be accommodated in a relatively small space so facilitating a rotary cutter configuration in which the cutting means are carried by radially extending arms. Furthermore, if the wedge element adjustment means can be made accessible on the leading/trailing faces of the rotor arms it is possible for them to be easily reached when the apparatus is not running because the rotor configuration has free space in these regions that is not available in the rotor drum configuration.

In a preferred arrangement, the or each anvil element is adjustable by said wedge element radial adjustment means, and the or each cutter element is adjustable to bear against a fixed radial stop on its rotor arm.

Preferably, one rotor of the pair is held on mountings provided with resilient loading means that allow displacement of the rotor relative to the other rotor of the pair, eg. in the manner of a mechanism according to the first aspect of the invention. Thus, in contrast to prior art arrangements in which the individual cutting elements are made compliant, there can be resilient yielding between the rotors themselves when needed to prevent the contact pressure between them increasing unduly.

An example of the invention will be described by way of example with reference to the accompanying drawings.

DETAILED DESCRIPTION OF THE PREFERRED EMBODIMENT

Figure 1:
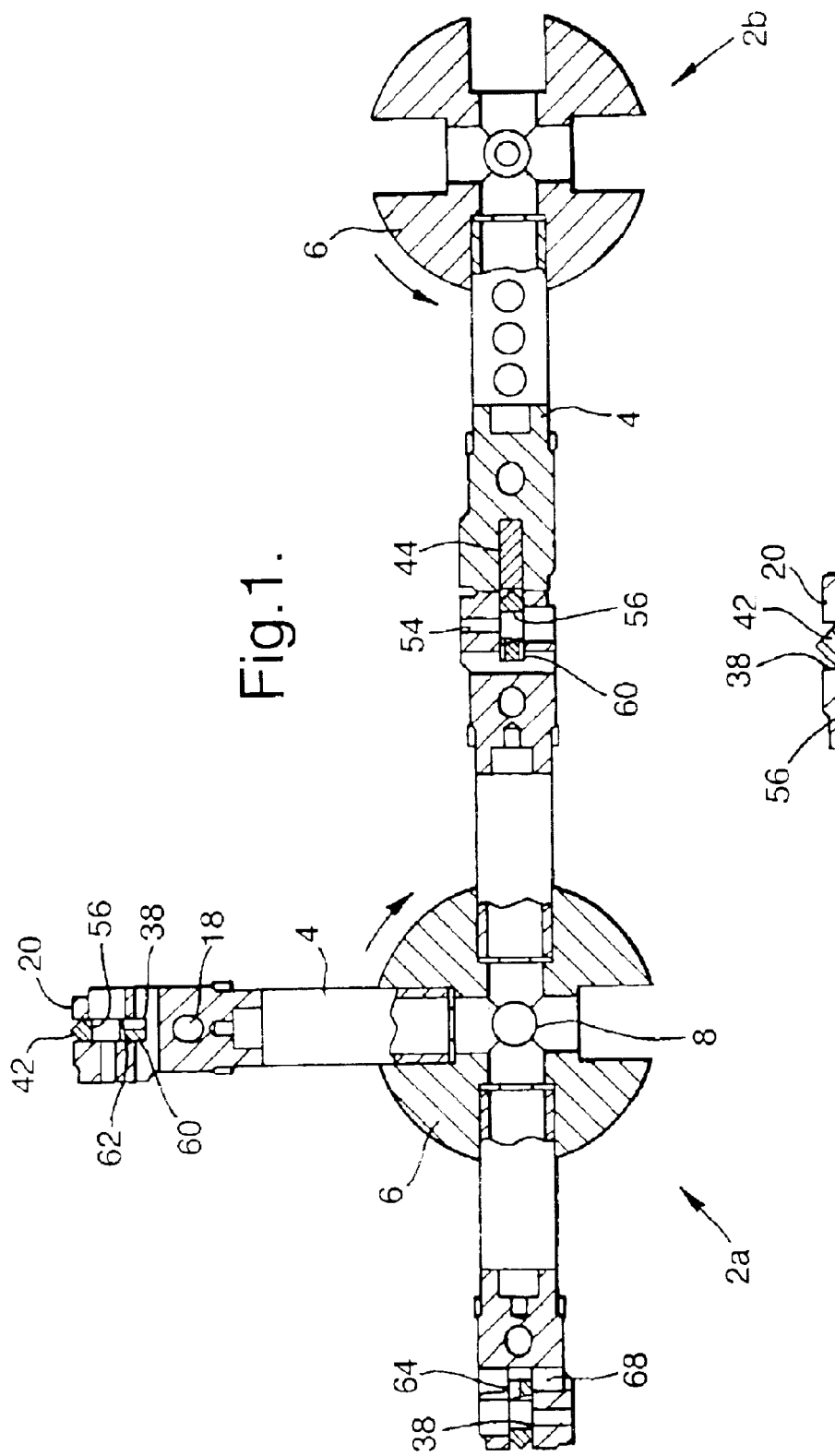
FIG. 1 is a radial sectional view of a pair of cutter-sealer rotors according to the invention, each rotor being sectioned in a different radial plane to illustrate further detail and, for clarity, not all the rotor arms and securing screws being shown in place.
Figure 2:
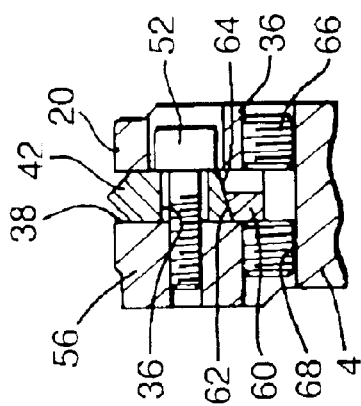
FIG. 2 is a larger scale detail of the outer tip of one of the rotor arms carrying a cutter bar that is radially adjustable.
Figure 4:
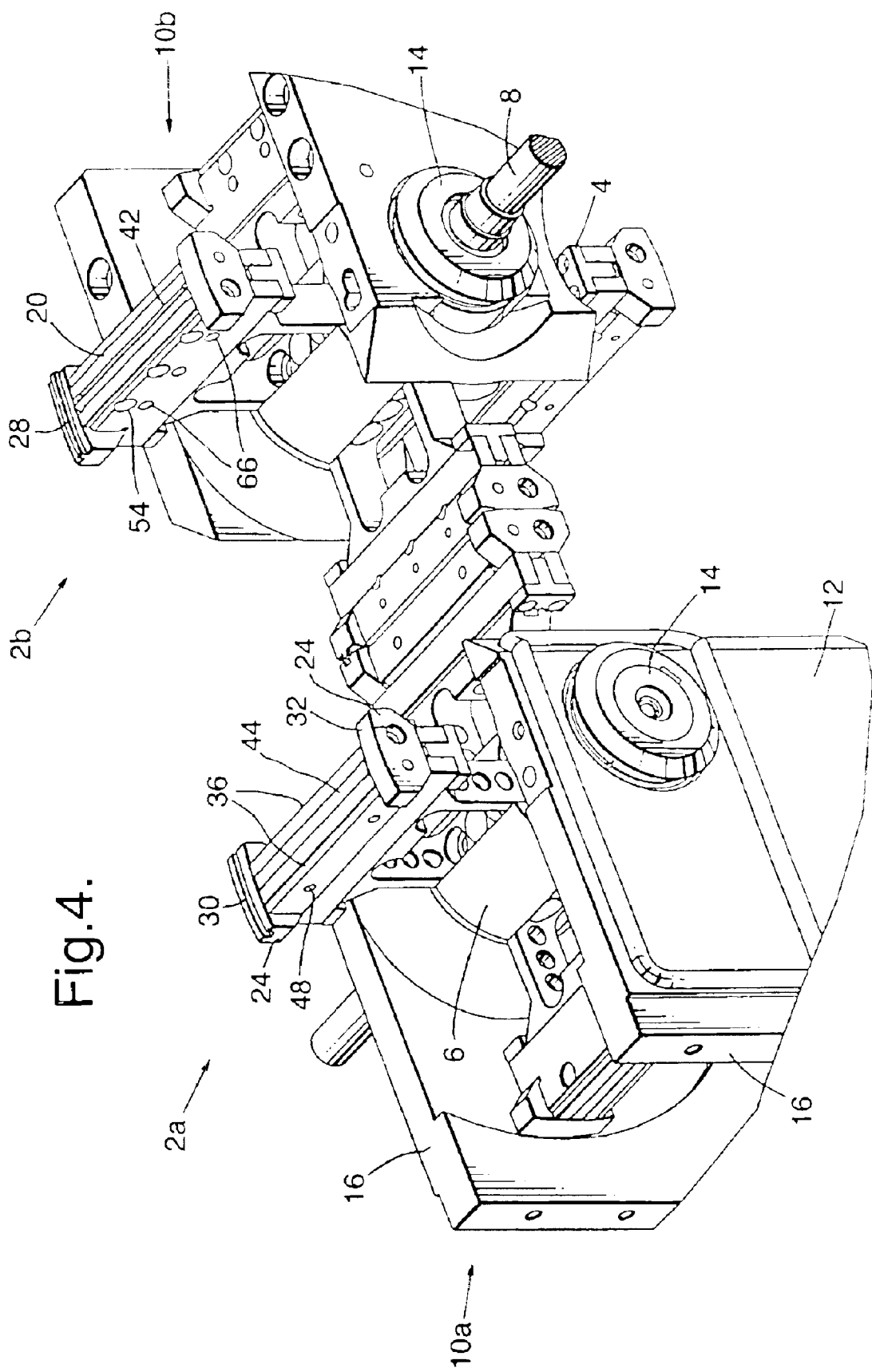
FIG. 4 is an isometric view of the cutter-sealer rotors of FIG. 1 in their mountings.

The drawings show a pair of parallel rotors 2a, 2b each having four equispaced arms 4 mounted on a central core 6 secured to a concentric shaft 8. The rotors are mounted in respective carriers 10a, 10b (FIG. 4) held in the machine frame shown only fragmentarily at 12. The shaft 8 of each rotor is supported in bearings 14 mounted in a pair of spaced side plates 16 of the carrier between which the rotor is located. Drive means (not shown) rotate the rotors in opposite directions and their movement is synchronised so that pairs of opposed arms 4 of the respective rotors 2a, 2b pass together through the axial plane containing both rotor axes, as shown in FIG. 1. The manner of mounting and of driving the rotors is substantially as disclosed in U.S. Pat. No. 5,548,947, the contents of which are incorporated herein by reference.

Figure 3:
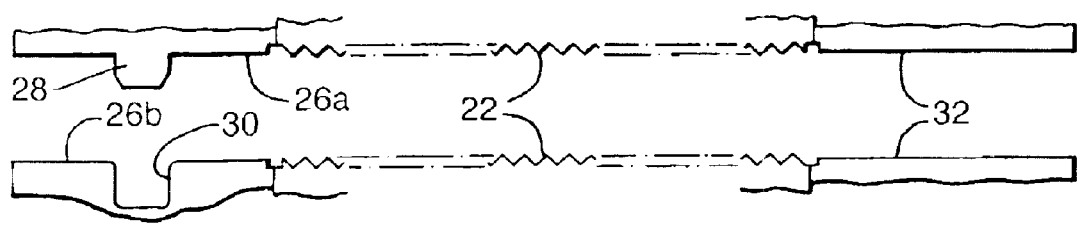
FIG. 3 is a larger scale detail view of the profiles of the pressure and bearer faces at the outer extremities of the pair of cooperating rotor arms.

The arms of both rotors have heat sealing means including arcuate pressure faces 20 on their radial extremities formed with a continuous series of mating crimping grooves 22 (FIG. 3). The pressure faces are heated by cartridge heaters (not shown) in bores 18 in the arms. Heat and pressure from the faces 20 seal together a multiple layer thermoplastic web, eg. a flattened tubular web (not shown), when it is nipped between the mating crimping grooves 22 (FIG. 3) of the pressure faces as each pair of arms of the respective rotors come together, in the manner shown in FIG. 1, during the rotation of the rotors.

Beyond the opposite ends of each pressure face 20 there are secured end pieces 24 providing longer arcuate end bearer faces concentric with the rotor. As can be seen more clearly in FIG. 3, beyond one end the crimping profile 22 of each mating pair of pressure faces, there are a co-acting pair of bearer faces 26a, 26b having a tongue 28 and a groove 30, respectively, along their arcuate extent, which interengage as the rotor arms come together to nip the web between them. The groove 30 has a rectangular profile and the tongue 28 is a sliding fit in the groove but its height is less than the depth of the groove so their end faces do not make contact. Beyond the other end of the pressure faces, the coacting bearer faces 32 have plain arcuate surfaces.

The bearer faces 26a, 26b, 32 serve two primary functions. Because they project a small distance beyond the mean height of the crimping grooves 22 in the pressure faces they set a spacing between the pressure faces 20 which will determine the sealing pressure applied to the web passing between them. Also, the pair of bearer faces 26a, 26b carrying the tongue 28 and groove 30 ensure transverse alignment of the pressure faces 20 and their crimping grooves. Because the bearer faces extend forwardly beyond the pressure faces in the direction of rotation, interengagement of the tongue 28 and groove 30 aligns the crimping grooves 22 before the pressure faces come together. The main cylindrical areas of the bearer faces spread the contact force, so that a long service life can be assured.

Within the width of each pressure face 20, transverse walls 36 define a central slot 38 extending between the end pieces 24. Cutting means for severing the webs are mounted in the slots, comprising an edged cutter bar 42 on each arm of one rotor and a cooperating anvil bar 44 on each arm of the other rotor presenting a plain face to the cutting edge of its opposed cutter bar.

Each anvil bar 44 is fixed in position in its slot 38 by a pair of clamping bolts 46 that extend between the walls 36 and through bores (not shown) in the anvil bar. The bolts 46 comprise an eccentric central portions (not shown) fitting the bores in the anvil bar By rotating the bolts, the radial position of the anvil bar 44 on the rotor can thus be adjusted. The bolts 46 are then clamped in their rotated positions by tightening nuts (not shown) which are threaded onto their shanks so that the transverse walls 36 are gripped between the bolt heads and the nuts.

Each cutter bar 42 is clamped by three bolts 52 passing through bores 54 in transverse walls 36 of its rotor arm on each side of the cutter bar slot and bores 56 in the bars. Means are also provided for adjusting the position of each cutter bar 42 radially on the rotor, before it is clamped in place, comprising a wedge bar 60 resting on the bottom of the cutter bar slot 38. The wedge bar 60 has a radially outer face 62 that is inclined with respect to the direction of rotation, that is to say from front to rear in its direction of movement. The radially-inner face 64 of the cutter bar bears on the wedge bar outer face 62 and has a complementary inclination relative to the direction of the rotation. The wedge bar 60 is only about half as wide as the slot 36 but is fixed in place by pairs of set screws 66 which engaged tapped holes 68 in both transverse walls 36 of its rotor arm. The wedge bar 60 can thereby be adjusted relative to the width of the slot 38, ie. in the direction of rotation, by movement of the screws 66, and fixed in its adjusted position by tightening the screws to grip it firmly between them.

Because the inclined faces 64,62 of the wedge bar 60 and cutter 42 bar are kept in contact, the cutter bar will move radially inwards and outwards with the adjustment of the wedge bar across the width of the slot. The bores 56 in the cutter bar provide sufficient clearance for their bolts to allow this movement to take place and when the desired position of adjustment is reached the bolts 52 are tightened to clamp the cutter bar in the same manner as the anvil bar.

Figure 5:
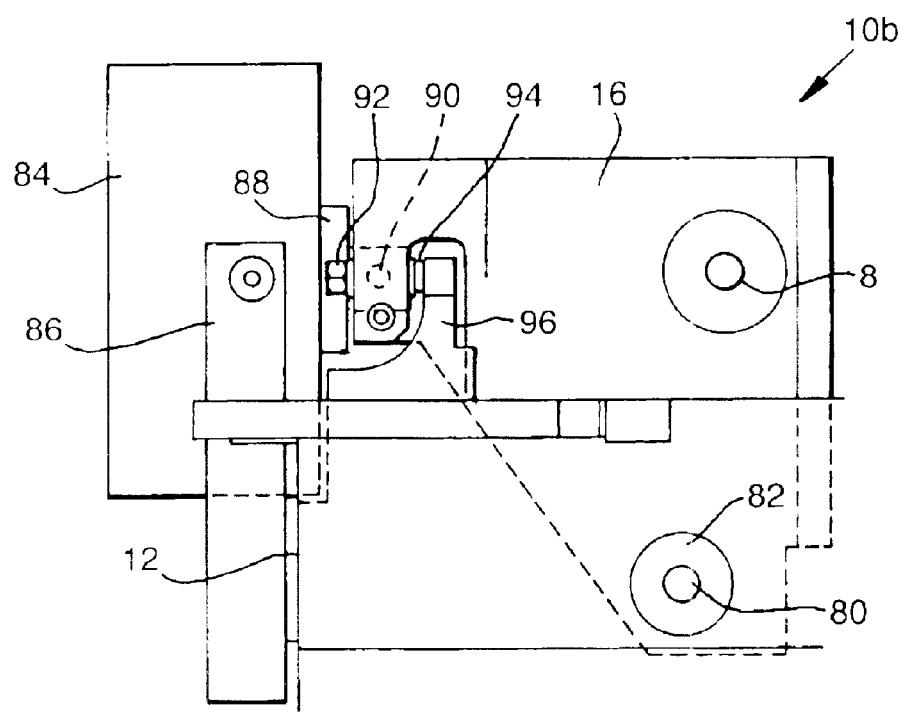
FIG. 5 is a detail illustration of the adjustable mounting of one of rotors of a pair.

The carrier 10a of one rotor is rigidly secured to the fixed machine frame 12. The other carrier 10b is pivotally connected to a pivot shaft 80 (FIG. 5) on the machine frame 12 through bearings 82 in the lower region of the side plates 16 so that the carrier 10b can tilt about an axis that lies close to a plane through the rotor axis and normal to the common diametrical plane through both rotor axes. A pressure cylinder 84 is pivotally mounted on a yoke 86 projecting from the fixed machine frame and has a piston 88 which urges the rotor carrier 10b forwards, acting on the carrier in the common diametrical plane of the rotors. The piston 88 is connected to the carrier through trunnion bearings 90 in the side plates 16 so that the pressure cylinder 84 is isolated from any pivoting movement of the carrier. Each of the side plates 16 carries a stop screw 92 which abuts against a stop button 94 fixed to an arm 96 extending from the machine frame to limit the forward displacement of the carrier. The stop screws 92 are adjustable to change the maximum forward displacement.

In use, with the rotary axis of the other rotor of the pair fixed, the stop screws 92 are set and locked in a position that would give a slight interference between the pressure faces 20 of the rotors as a pair of arms come together. Before the pressure faces come together, of course, the bearer faces of the end pieces 24 make contact, and the pressure cylinder 84 allows its rotor to yield rearwards and provides a predetermined force for the contact between the rotors.

The amount of movement required will be small, typically a few microns, and the stop screws 92 are able to ensure the degree of interference in the setting of the adjustable rotor is sufficiently small to avoid large vibrational disturbances when the contact faces engage. By having a single pair of stops located on the level of the pressure cylinder centre line, which is also coplanar with the trunnion bearings 90, adjustment is simplified. Disturbance of the alignment of the rotors is avoided in particular because any displacement of the axis of the rotor 2b takes place in substantially the common plane of the rotor axes on account of the location of the carrier pivot shaft 80.

To set the cutting means in their required positions of adjustment before use, firstly measurements can be made of the radial position of the outer face of each anvil bar relative to the bearer faces of the end pieces 24 at each end of the bar after it has been forced into engagement with the base of its slot by rotation of the eccentric bolts and secured in that position. Similar measurements can be made for position of the cutting edge of the associated cutter bar relative to its bearer faces while it bears on the wedge bar at the bottom of the slot. The wedge bar position is then adjusted by the set screws to displace the contacting cutter bar radially until the combined measurements for the anvil and cutter bars give a predetermined value which has been found empirically to produce the required cutting action.

It will be understood that by making the measurements described at opposite ends of the cutter and anvil bars and adjusting the cutter bars accordingly, it is also possible to exclude axial run-off between the bars in the adjusted setting, so that a uniform cutting pressure can be achieved along the length of the cut.

As can be seen from the drawings, the relatively slender rotor arms leave considerable free space in the regions between them. This space is available not only to accommodate the product being sealed and cut, and any auxiliary mechanisms such as guidance devices that the product might require, but also it allows the circulation sealing means and to carry away dust or other foreign matter. The adjusting and clamping bolts and screws are all easily accessible in the front and rear faces of the rotor arms because of the free space there. At the same time, they do not encroach on the end faces of the rotors so do not interfere with the mounting of the heating means and other auxiliary devices such as thermostatic control means (not shown) in these faces.

It will be understood that the illustrated apparatus can be modified in many ways within the scope of the invention. For example, the rotors may be provided with only the web sealing means or the cutting means is desired. When the cutting means are provided, the wedge adjustment means described may be employed to adjust the anvil elements to pre-set cutter elements, in which case the cutter elements may be made adjustable by the eccentric bolt arrangement used for the anvil bars in the illustrated example. Alternatively, both the cutter and anvil elements may be adjustable in situ, possibly each being provided with the wedge adjustment means described. Also, the rotor in the adjustably mounted carrier may have the cutter bars instead of the anvil bars as illustrated.

Figure 6:
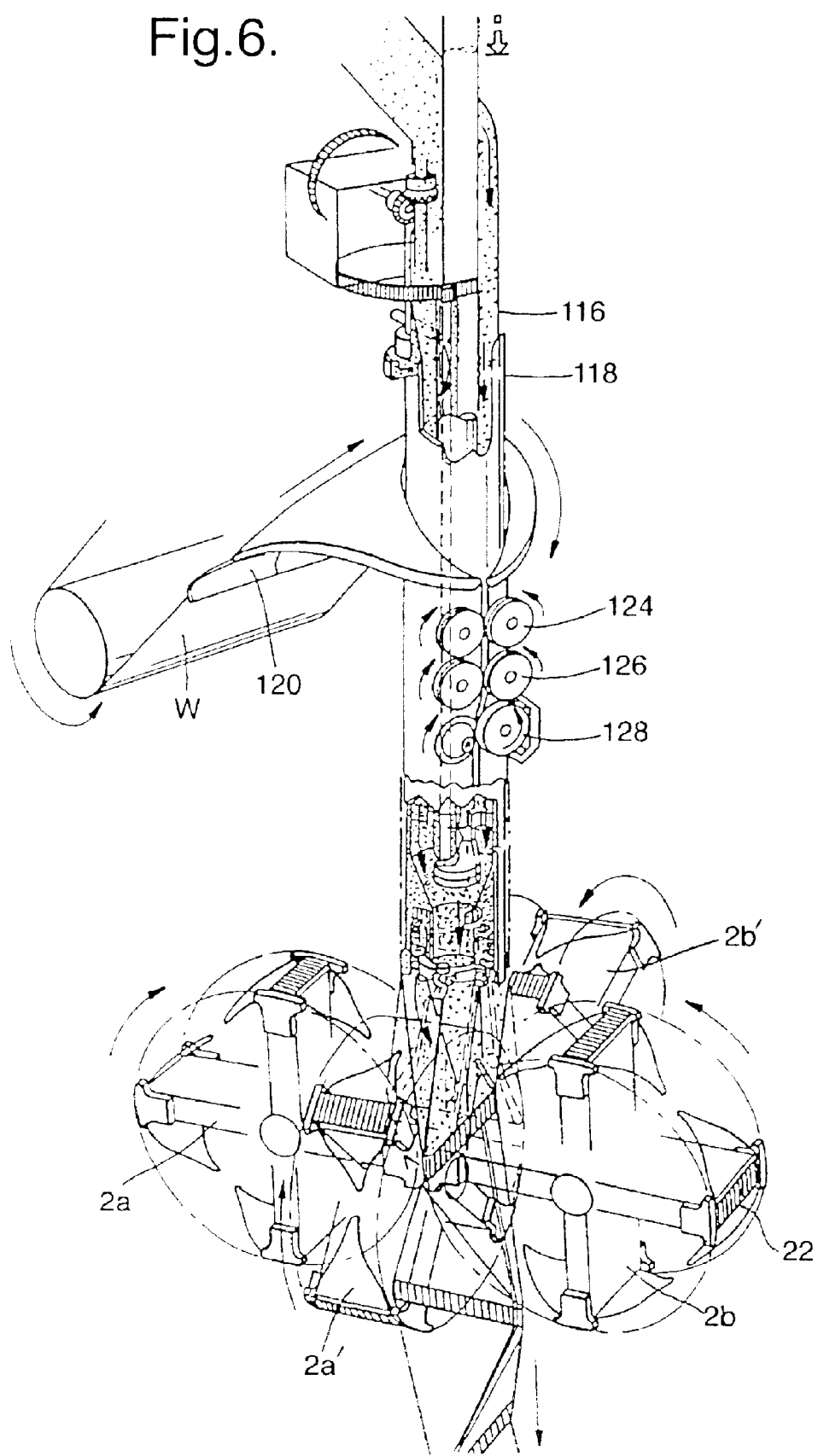
FIG. 6 illustrates a form-fill apparatus for the production of packets utilising the rotor arrangements of the preceding figures.

By way of further illustration FIG. 6 shows two pairs of rotors 2a, 2b and 2a', 2b' of the form described above in a form-fill apparatus for producing sealed packets. Material to be packeted is fed through a feeder tube 116 to a former tube 118. A web W of packaging material is drawn over a shaping guide 120 near the upper end of the former tube 118. Here the initially flat web W turns downwards from an upwardly inclined path to take up the tubular form of the former tube exterior and is drawn down the tube while its opposite side edges are sealed together as it approaches the lower end of the tube. Immediately below the feed tube the web is first sealed transversely by the rotors 2a, 2b and 2a', 2b' in synchronism with the delivery of the doses of particulate filling from the interior of the former tube, to form individual packets containing doses of the material, and the chain of packets is then separated by a cutting operation. The web is drawn down the outer face of the former tube 118 by pairs of rollers. These include pairs of heating and pressing rollers 124, 126 between which the opposite edges of the web are sealed together longitudinally. The welded seam is then laid down against the tubular web by a roller and disc pair 128.

The two pairs of rotors 2a, 2b and 2a', 2b' have their rotary axes in the same plane and are at 90° to each other and to the web axis. The arms of the pairs of rotors interdigitate or interlace to operate in alternation on the tubular web in order to produce tetrahedral-form packets.

The rotors shown in FIG. 6 have bearer faces provided with the crimp sealing means and transverse location means of the form described above. It will be understood without further illustration that, as already described, cutting means can be incorporated or that a corresponding two pairs of rotors provided with cutting means for separating the packets at each transverse seal can be disposed below the illustrated pairs of rotors 2a, 2b and 2a', 2b'. If such a second set of rotors is provided however, it may not be necessary to control their transverse location as closely as the first set of rotors if a straight cut is made across the web material.

What is claimed:

1. A rotary mechanism comprising:
   at least one pair of rotors mounted on spaced, parallel axes of rotation and rotatable on said axes in opposite directions to each other,
   each rotor having a plurality of radially projecting arms,
   radially outer faces on said arms of each rotor directed away from the axis of rotation of said rotor,
   the radially outer faces of said pair of rotors being brought together in juxtaposition by said rotation of the rotors,
   at least one of sealing means and cutting means at said radially outer faces for engaging web material between the juxtaposed outer faces to seal and/or cut said web material,
   bearer means on opposite end regions of said outer faces for contact with each other when said outer faces come together,
   the cutting and/or sealing means being disposed between the bearer means on each face whereby said contact of the bearer means sets a spacing between the cutting and/or sealing means on the respective faces,
   at one end region of the juxtaposed outer faces the bearer means comprising locating elements positioning the faces to constrain relative movement between the bearer means in the direction of the axes of rotation of the pair of rotors, and
   at the opposite end region of said faces the bearer means comprising bearing elements permitting relative movement in said axial direction
   wherein the bearing and locating elements extend forwardly of the cutting and/or sealing means on the respective outer faces in the direction of rotation.

2. A rotary mechanism according to claim 1 wherein the bearing and locating elements extend both forwardly and rearwardly beyond the cutting and/or sealing means on the respective outer faces in said direction of rotation.

3. A rotary mechanism according to claim 1 wherein the locating elements of the pair of juxtaposed faces or each said pair of juxtaposed outer faces of the rotor arms comprises, on each element, a pair of locating faces extending in substantially radial planes to said axes of rotation, the pair of locating faces on one of said pair of outer faces being engaged between the pair of locating faces on the other outer face of said pair.

4. A rotary mechanism according to claim 3 wherein said pairs of locating faces are formed on opposite sides of respective male and female portions of the bearer means at said one end region, and respective outer and inner faces between said pairs of faces are maintained out of contact with each other.

5. A rotary mechanism according to claim 1 wherein the bearer means at said one end region have contacting faces for setting said spacing of the sealing and/or cutting means of the rotor arms, said contacting faces occupying a major part of the axial extent of the bearer means at said end region.

6. A rotary mechanism according to claim 1 having, on said outer faces of the respective rotors, at least one elongate cutter element and a radially outer cutting edge on said element, and at least one elongate anvil element for cooperation therewith, the cutter and anvil elements providing said cutting means and each of said cutter and anvil elements extending between the bearer means end regions of their respective rotor arms, a mechanism being provided for radial adjustment of at least one of the or each cooperating pair of cutter and anvil elements with respect to the other.

7. A rotary mechanism according to claim 1 having circumferentially grooved surfaces on said outer faces for providing said sealing means and for applying heat sealing crimps to the web material between the juxtaposed outer faces.

8. A rotary mechanism according to claim 7 wherein an opening is provided in each said grooved surface to receive an element of the web material cutting means.

* * * * *